US005756063A

United States Patent [19]
Nuernberg et al.

[11] Patent Number: 5,756,063
[45] Date of Patent: May 26, 1998

[54] PROCESS FOR MANUFACTURING ISOCYANATES AND PRODUCING REAGENT GRADE HYDROCHLORIC ACID THEREFROM

[75] Inventors: K. Edward Nuernberg; Hans V. Schwarz, both of Baton Rouge, La.

[73] Assignee: BASF Corporation, Mt. Olive, N.J.

[21] Appl. No.: 863,549

[22] Filed: May 27, 1997

Related U.S. Application Data

[63] Continuation of Ser. No. 639,175, Apr. 26, 1996, abandoned, which is a continuation of Ser. No. 283,495, Aug. 1, 1994, abandoned, which is a continuation of Ser. No. 40,792, Mar. 31, 1993, abandoned.

[51] Int. Cl.[6] ................................................. C07C 263/10
[52] U.S. Cl. .................... 423/488; 423/139; 423/DIG. 1; 423/DIG. 14; 570/347
[58] Field of Search ..................... 423/488, 139, 423/DIG. 14, DIG. 1; 210/684, 688; 560/347

[56] References Cited

U.S. PATENT DOCUMENTS

| | | | |
|---|---|---|---|
| 2,695,875 | 11/1954 | McGarvey | 423/488 |
| 3,544,611 | 12/1970 | Michelet et al. | 560/347 |
| 4,096,165 | 6/1978 | Meyers | 560/347 |
| 4,193,932 | 3/1980 | Yamamoto et al. | 560/347 |
| 4,349,524 | 9/1982 | Yamashita et al. | 423/488 |
| 5,174,865 | 12/1992 | Stultz et al. | 203/12 |
| 5,202,106 | 4/1993 | Vanlautem | 423/488 |

FOREIGN PATENT DOCUMENTS

| | | | |
|---|---|---|---|
| 249190 | 9/1987 | German Dem. Rep. | 423/DIG. 1 |
| 51-119396 | 10/1976 | Japan | 423/488 |
| 54-1273 | 1/1979 | Japan | 423/139 |

OTHER PUBLICATIONS

EPO Search Report dated Jul. 4, 1994.
Patent Abstracts of Japan vol. 14, No. 544, 4 Dec. 1990.
Ullman's Encyclopedia of Industrial Chemistry, vol. A14, 1989 pp. 616–620 (no month).
Kraus et al, "Anion exchange Studies . . . in Hydrochloric Acid", J. Am. Chem. Soc., vol. 75, pp. 1460–1462 (Mar. 1953).
Rohm & Haas, "Iron Removal From HCl", p. 7 (no date).
Abstract, Kozlova, L.A., "Rapid Method For The Removal of Iron Ions From Hydrochloric Acid Reagents," An CA 90(26): 214589f, STN International (1978) (no month).
Reents et al, "Anion Exchange Removal of Iron from Chloride Solutions" Industrial and Engineering Chemistry, vol. 47, No. 1, Jan. 1955, pp. 75–77.

*Primary Examiner*—Ngoc-Yen Nguyen
*Attorney, Agent, or Firm*—Fernando A. Borrego

[57] ABSTRACT

Reagent grade hydrochloric acid having an iron content of less than 200 p.p.b. is made from an industrial organic isocyanate manufacturing process by removing hydrogen chloride from organic isocyanates produced in the reaction between phosgene and an organic amine, converting the hydrogen chloride to concentrated aqueous hydrochloric acid, and contacting the acid with a strongly basic anion exchange resin.

18 Claims, No Drawings

PROCESS FOR MANUFACTURING ISOCYANATES AND PRODUCING REAGENT GRADE HYDROCHLORIC ACID THEREFROM

This is a continuation of U.S. patent application Ser. No. 08/639,175, filed Apr. 26, 1996, now abandoned, which is a continuation of Ser. No. 08/283,495, filed Aug. 1, 1994, now abandoned, which is a continuation of Ser. No. 08/040,792, filed Mar. 31, 1993, now abandoned.

FIELD OF THE INVENTION

The invention pertains to a process for the purification of byproducts produced during the manufacture of organic isocyanates, and more particularly, to a process for the removal of a hydrochloric acid stream from the manufacture of organic isocyanates and passing the hydrochloric acid stream over a bed of a strongly basic anionic exchange resin to produce reagent grade hydrochloric acid containing iron impurities in an amount of no more than 200 parts per billion.

BACKGROUND OF THE ART

It is well known that organic isocyanates, including the more commonly known diisocyanates such as diphenylmethane diisocyanate and toluene diisocyanate, may be manufactured by contacting in a reaction chamber an excess of phosgene ($COCl_2$) with an organic amine, such as toluenediamine (TDA) or diphenylmethane diamine (MDA), in the presence of a solvent. The reaction products between phosgene and an organic amine, more specifically an aromatic diamine, are the corresponding organic isocyanate and hydrogen chloride according to the following equation:

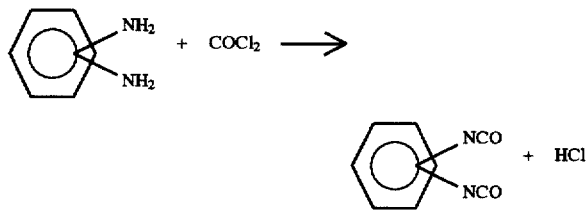

Most of the hydrogen chloride is a vapor which may be removed from the manufacture of the organic isocyanate at the overhead of the reaction chamber for collection, conversion to aqueous hydrochloric acid, and eventual sale. Although most of the hydrogen chloride evolves as a gas in the reaction between the organic amine and phosgene, some remains entrained in the isocyanate stream along the bottom of the reaction chamber. The entrained hydrogen chloride may be recovered further downstream by way of, for example, distillation. The hydrogen chloride vapor collected from all stages in the manufacture of organic isocyanates is liquified by contact with water to produce aqueous hydrochloric acid, which is then sold as technical grade hydrochloric acid.

The hydrochloric acid can only be sold as technical grade or food grade because it often contains iron contaminants in amounts greater than 200 parts per billion. Until now, it has been impossible to guarantee reagent grade quality hydrochloric acid removed from the industrial manufacture of organic isocyanates. The source of iron in the manufacture of organic isocyanates is not known for certain; however, it is believed that trace amounts of iron may be present in the water used to liquify gaseous hydrogen chloride, or the gaseous hydrogen chloride may slightly corrode the inner lining of the reaction chamber, pipes, fittings, etc. due to the presence of minor traces of water impurities in the reaction chamber. Nevertheless, it has been found that in spite of every effort to reduce potential sources of iron contaminants, the amount of iron contaminants present in the hydrochloric acid uncontrollably fluctuates between 100 p.p.b. to 500 p.p.b., meaning that it is impossible to guarantee consistent production of reagent grade hydrochloric acid defined as having iron in an amount of 200 p.p.b. or less.

It would be desirable to manufacture reagent grade aqueous hydrochloric acid taken from an organic isocyanate industrial manufacturing process. Although pure hydrochloric acid is currently produced by reacting hydrogen gas with chlorine gas under heat, the hydrogen chloride gas produced in this process is costly.

As described in "Anion Exchange Removal of Iron from Chloride Solutions," by A. C. Reents et al. in *Industrial and Engineering Chemistry*, Vol. 47, pages 75–77 (1955); and "Rapid Method for the Removal of Iron Ions from Hydrochloric Acid Reagents" by L. A. Kozlova in *Metody Anal. Kontrolya Kach. Prod. Khim. Prom-sti.*, (10), 33–4, removing iron impurities from hydrochloric acid using a strongly basic anion exchange resin is known per se. Until now, however, it has not been suggested that this method of purification may be applied to hydrochloric acid byproducts removed from the industrial manufacture of organic isocyanates. Nor has the desirability of removing iron impurities from hydrochloric acid produced in the manufacture of organic isocyanates at or below 200 p.p.b., and further by using a strong basic anion exchange resin, been suggested until now.

OBJECT OF THE INVENTION

It is an object of the invention to produce reagent grade hydrochloric acid from hydrogen chloride produced as a byproduct during the manufacture of organic isocyanates. This object has been met by the present invention comprising a process wherein an organic amine is reacted with phosgene in a reaction zone to produce an organic isocyanate and hydrogen chloride, removing the hydrogen chloride from the reaction zone, converting the hydrogen chloride to hydrochloric acid, and contacting the hydrochloric acid with a strong basic anion exchange resin. The effluent proceeding from the exchange resin consistently comprises hydrochloric acid containing less than 200 p.p.b. iron, qualifying the acid as a reagent grade acid.

DETAILED DESCRIPTION OF THE INVENTION

In the process of the invention, an organic amine is reacted with phosgene to produce the corresponding organic isocyanate and hydrogen chloride.

Suitable organic amine starting materials include aromatic, aliphatic, and cycloaliphatic amines and mixtures thereof, having at least one primary amino group, preferably two or more primary amino groups, and most preferable are the diamines. Specific non-limiting examples of aliphatic amines include monoamines having 1 to 12, preferably 1 to 6 carbon atoms, such as methylamine, ethylamine, butylamine, hexylamine, octylamine, decylamine and dodecylamine; aliphatic diamines such as 1,2-diaminoethane, 1,4-diaminobutane, 1,6-diaminohexane, 2,2-dimethyl-,3-propanediamine, 2-methyl-1,5-pentadiamine, 2,5-dimethyl-2,5-hexanediamine, and 4-aminomethyloctane-1,8-diamine, and amino acid-based polyamines such as lysine methyl ester, lysine aminoethyl ester and cystine dimethyl ester; cycloaliphatic monoamines of 5 to 12, preferably of 5 to 8, carbon atoms in the cycloalkyl radical, such as cyclohexylamine and cyclo-octylamine and preferably cycloaliphatic diamines of 6 to 13 carbon atoms, such as cyclohexylenediamine, 4,4'-, 4,2'-, and 2,2'-diaminocyclohexylmethane and mixtures thereof; aromatic monoamines of 6 to 18 carbon atoms, such as aniline, benzylamine, toluidine and naphthylamine and preferably aromatic diamines of 6 to 15 carbon atoms, such as phenylenediamine, naphthylenediamine, fluorenediamine, diphenyldiamine, anthracenediamine, and preferably 2,4- and 2,6-toluenediamine and 4,4'-, 2,4'-, and 2,2'-diaminodiphenylmethane, and aromatic polyamines such as 2,4,6-triaminotoluene, mixtures of polyphenyl-polymethylene-polyamines, and mixtures of diaminodiphenylmethanes and polyphenyl-polymethylene-polyamines. Individual monoamines, diamines and polyamines, or mixtures thereof, may be phosgenated. Instead of the free amines, the salts of the amines with volatile acids, for example, their hydrochlorides or mixtures of the free amines and their salts with volatile acids, can be employed. Since hydrogen chloride is formed as a volatile byproduct of the reaction of phosgene with the primary amino group in amounts proportional to the isocyanate groups formed, the preferred salts to use are amine hydrochlorides.

The other starting material may be any compound which, when reacted with the organic amine, produces as reaction products the corresponding organic isocyanate and hydrogen chloride. Typically, the other starting material is phosgene.

Methods of manufacturing organic isocyanates are well known to those of ordinary skill in the art and include reacting phosgene with organic amines having at least one primary amino group in the presence of inert solvents at elevated temperatures and pressures in one stage; or, as an alternative, a stoichiometric excess of phosgene may be mixed with the primary amine at temperatures ranging from −30° to 60° C. at atmospheric or superatmospheric pressures and subsequently completing the conversion to polyisocyanate by increasing the temperature to 100° to 200° C. optionally and preferably under pressure. Any process employed in the manufacture of the organic isocyanate is within the scope of the invention as long as hydrogen chloride is released as a reaction product.

Hydrogen chloride may be removed from any location along the manufacture/separation/and/or purification stages involved in an organic isocyanate production plant. Removal may be from the one or more reaction zones where the organic amine is reacted to produce organic isocyanate, from a degasser connected to the reaction zone, and/or from distillation/separation towers further downstream from the reaction zones or degasser. Typically, the vast majority in excess of 90 weight percent up to 100 weight percent of the total hydrogen chloride collected is removed from the reaction zone(s) or from a degasser connected to the reaction zone.

Depending on the particular process and equipment employed at a plant, hydrogen chloride may be removed as a vapor or as a liquid. Hydrogen chloride may be removed as a liquid from reaction zones under superatmospheric pressures, or it may be released as a gas in reaction zones having pressures under the vapor pressure of hydrogen chloride.

The term "hydrochloric acid" is meant the ionization of hydrogen chloride in any solvent which will accept the proton from hydrogen chloride to form the positive ion of the solvent. Typically and preferably, hydrogen chloride is dissolved in water to form the hydronium ion and is referred to herein as aqueous hydrochloric acid. Methods for converting hydrogen chloride to aqueous hydrochloric acid are well known to those of skill in the art. Two suitable methods include the packed tower absorption process and the falling film process. The packed tower absorption process can utilize countercurrent or parallel flows and may be adiabatic or isothermal. The falling film process may be used alone or in conjunction with packed towers. In the adiabatic absorption process, hydrogen chloride gas enters the bottom of a packed tower and rises upward. Water enters toward the top, falls preferably countercurrent to the rising hydrogen chloride gas, absorbs the hydrogen chloride, and descends to the bottom of the packed absorber as aqueous hydrochloric acid. If hydrogen chloride is removed as a liquid from the reaction zone or from other locations in the plant, it is preferably vaporized by pressure reduction prior to entry into the HCl absorption tower. The water supply to the absorbers is preferably demineralized prior to entry in the absorbers to reduce contaminants. More than one absorption tower may be employed to handle large volumes of hydrogen chloride gas.

A falling film absorption process may advantageously be employed alone or in conjunction with the packed tower absorbers. Hydrochloric acid effluent from the packed towers may have an HCl concentration from 20 to 32 weight percent, which is considered weak. The weak acid from the packed towers, along with a fresh charge of HCl gas, may be fed into the top of a falling film absorber and allowed to fall by gravity or pumped to the bottoms to produce strong aqueous hydrochloric acid having an HCl concentration from 35 weight percent to 42 weight percent at normal pressure. The fresh charge of HCl gas is preferably obtained from gaseous HCl vent stream sources along the plant. The HCl concentration can be varied by adjusting the flow of water relative to the flow of HCl gas to control the removal of the heat of absorption. More than one falling film absorber may be employed.

The concentration of the aqueous hydrochloric acid in the invention is from 25 weight percent to 42 weight percent, preferably from about 35 weight percent (21.9° Bé) to about 39 weight percent (23.8° Bé), most preferably from 36 weight percent (22.4° Bé) to 38 weight percent (23.4° Bé) at one atmosphere and 25° C. At concentrations lower than 25 weight percent, it is only with difficulty that the iron contaminants present in the aqueous HCl acid form a complex chloride anion. The tendency of iron in aqueous HCl acid concentrations below 25 weight percent is to remain in the acid as $Fe^{+3}$ or $Fe^{+2}$ cations. At more concentrated acid solutions having 36 weight percent HCl or more, the iron contaminants readily form complexes with the chloride ions, thereby bonding to the cationic sites on the resin. Trivalent iron $Fe^{+3}$ contaminants react with chloride ions from the ionized hydrogen chloride to form an $FeCl_4^-$ complex or if the iron complex is divalent $Fe^{+2}$, it will react to form an $FeCl_4^{-2}$ complex. These complexes readily bond to the strongly basic quaternary ammonium cationic sites on the exchange resin and are thereby removed from the aqueous HCl acid stream. Without being bound to a theory, if the concentration of the hydrogen chloride in hydrochloric acid is too weak, it is believed that insufficient ionized chloride ions are available to drive the reaction towards an $FeCl_4^-$ or $FeCl_4^{-2}$ complex. With HCl concentrations of at least 36 weight percent, optimal iron removal is attained since ferrous and ferric tetrachloride complexes form readily; and few, if any, iron atoms remain in solution as $Fe^{+3}$ or $Fe^{+2}$ cations, or $FeCl_3$ or $FeCl_2$ molecules.

Surprisingly, it was also found that at concentrations greater than 25 weight percent HCl in aqueous hydrochloric acid, preferably at least 36 weight percent, iron in the divalent $Fe^{+2}$ state was effectively removed from the acid without the necessity of first oxidizing $Fe^{+2}$ to the $Fe^{+3}$ state. Thus, in the process of the invention, both divalent $Fe^{+2}$ and trivalent $Fe^{+3}$ iron contaminants are removed from the acid.

Once the desired concentration is attained, the concentrated hydrochloric acid stream flows from the absorber(s) to the strongly basic anion exchange resin bed. The aqueous hydrochloric acid comes in contact with the exchange resin bed and exits as a purified effluent having less than 200 p.p.b. iron contaminants, preferably less than 100 p.p.b., more preferably less than 50 p.p.b. The level of iron contaminants has been reduced by the inventors herein to less than ten (10) p.p.b. The effluent acid with less than 200 p.p.b. iron may be sent to storage containers for sale as reagent grade hydrochloric acid, rather than food grade or technical grade hydrochloric acid.

The aqueous hydrochloric acid effluent may enter the resin bed from the top or bottom, preferably the bottom, of the vessel containing the resin. The resin bed may be fixed or moving intermittently or continuously. The flow of hydrochloric acid may be continuous or batchwise. It is preferred to use a process where the hydrochloric acid flows over a fixed resin bed on a continuous basis.

The residence time over the entire resin bed is effective to reduce the iron levels below 200 p.p.b. A suitable residence time across the entire bed ranges from 30 seconds to one hour, although less than ten minutes and even six minutes or less are preferred for economical reasons. Although a residence time greater than one hour is possible, it becomes impractical. The flow rate and empty vessel volume are dependent upon the desired residence time and the type of exchange resin employed. Accordingly, a suitable ratio of the empty vessel volume to the volumetric flow rate per minute is 1:2 to 60:1. Suitable minimum amounts of a given anionic exchange resin and minimum bed depths in the vessel are those recommended by manufacturer specifications for each particular strongly basic exchange resin employed. The aqueous hydrochloric acid stream is run over the resin bed at any temperature below the degradation temperature of the particular exchange resin. Although some upper temperature limitations may be as high as 200° C., it is preferred to run the acid through the resin bed at temperatures ranging from above 0° C. to 60° C.

The strongly basic anion exchange resin is any exchange resin having cationic sites effective to bind iron tetrachloro anions, whose carrier is resistant to strong acids, and preferably which can be regenerated with water or weakly acidic or weakly basic solutions. The strongly basic anion exchange resins employed in the process may be in the form of gel resin beads or in macroreticular form, preferably in gel form.

Suitable degrees of crosslinking range from 2 weight percent to 25 weight percent, with 3 weight percent to 15 weight percent being more preferred (degree of crosslinking being the weight percent of the crosslinking monomer relative to the total weight of all monomers). If the degree of crosslinking is too high, the ion exchange rate and moisture content drops; if the degree of crosslinking is too low, the resin has poor resistance to oxidation, swells excessively, and has a lower ion selectivity. The preferred degree of crosslinking and type of resin will be one that optimizes the exchange rate, is resistant to oxidation, and remains ion selective. Most preferable are those resins having a degree of crosslinking from 6 to 10 weight percent since these highly crosslinked resins do not swell excessively and exhibit good properties as aforementioned.

The strongly basic anion exchange resin may be Type I or Type II but is preferably a Type I exchange resin. Type I exchange resins having as the active group $—N(CH_3)_3^+$ exhibit less iron leakage than $—N(CH_3)_2 (C_2H_4OH)^+$ Type II resins. However, both Type I and II resins may be employed.

Methods for the preparation of strongly basic anion exchange resins are known. In general, the backbone is prepared by emulsion or suspension polymerizing and crosslinking one or more monoethylenically unsaturated monomer with one or more polyethylenically unsaturated monomer, in a non-solvent for the monomers, when it is desired to form a gel, or in a chemically inert solvent for the monomers immiscible in the suspending liquid followed by removal of the solvent from the bead when a macroreticular porous structure is desired. The polymer backbone is haloalkylated, followed by amination to produce the active cationic sites. Conventional and new methods for making the strongly basic exchange resin are described in U.S. Pat. Nos. 4,207,398; 4,101,577; and 2,591,573.

Mono-ethylenically unsaturated monomers include acrylic acid, methacrylic acid, methyl acrylate, ethyl acrylate, propyl acrylate, isopropyl acrylate, butyl acrylate, tert-butyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, polyoxyethyl acrylate, propoxypropyl acrylate, ethoxyphenyl acrylate, ethoxybenzyl acrylate, ethoxycyclohexyl acrylate, and the corresponding esters of methacrylic acid, styrene, 4-chlorostyrene, 3-chlorostyrene, vinyltoluene, vinylnaphthalene, vinylpyridine, 2-methyl-5-vinylpyridine, 2-ethyl-5-vinylpyridine, 3-methyl-5-vinylpyridine, 2,3-dimethyl-5-vinylpyridine, and 2-methyl-3-ethyl-5-vinylpyridine, 2-methyl-5-vinylquinoline, 4-methyl-4-vinylquinoline, 1-methyl- or 3-methyl-5-vinylisoquinoline, vinylpyrrolidone, N-vinylcaprolactam, N-vinylbutyrolactum, and the like. It is also possible to being with a copolymer of the above mono-ethylenically unsaturated monomers with other monoethylenically unsaturated compounds such as dialkyl maleates, dialkyl fumarates, dialkyl crotonates, dialkyl itaconates, and dialkyl glutaconates.

Polyethylenically unsaturated compounds include the following: 1,4-divinylbenzene, divinylpyridine, divinyltoluenes, divinylnaphthalenes, diallyl phthalate, ethylene glycol diacrylate, ethylene glycol dimethacrylate, 1,3-butanediol dimethacrylate, divinylxylene, divinylethylbenzene, divinylsulfone, polyvinyl or polyallyl ethers of glycol, of glycerol, of pentaerythritol, of mono- or dithio- derivatives of glycols, and of resorcinol, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinylsebacate, diallyl tartrate, diallyl silicate, triallyl tricarballylate, triallyl aconitate, triallyl citrate, triallyl phosphate, N,N'-methylenediacrylamide, N,N-methylenedimethacrylamide, N,N'-ethylenediacrylamide, 1,2-di(α-methylmethylene sulfonamido)ethylene, trivinylbenzene, trivinylnaphthalene, and polyvinylanthracenes.

Although various exchange resin embodiments and processes have been described herein, they are not limiting of the scope of the invention. Any strongly basic anionic exchange resin is within the scope of the invention. For example, more exotic exchange resins, such as those described in U.S. Pat. No. 4,273,878 employing polyamines having at least two tertiary amine groups of which at least one is a terminal group, are also useful. Strongly basic anionic exchange resins are defined herein as any resin which possesses a cationic active site carrying at least a +1 charge.

The exchange resin bed may remain in service until iron begins to leak into the effluent hydrochloric acid stream in amounts greater than 200 p.p.b. At this stage, the resin bed may be regenerated by simply passing a stream of water over the resin bed. The water may be demineralized or may be a weak acidic or basic solution. Methods for regeneration are known and will vary somewhat depending on the particular type of anionic exchange resin employed. As a non-limiting example, a chloride salt form of the exchange resin bed may be regenerated with a weak downflow of an aqueous salt solution at a flow rate of about the same as the flow rate used for the hydrochloric acid solution or less until little or no iron and hydrochloric acid are detected in the effluent stream, then backwashed with water to remove particulate matter, rinsed with water, and then re-entered into service. The resin bed may be regenerated more than once prior to re-entry of the resin bed into service.

The process of the invention is widely applicable to any phosgenation process which results in the release of hydrogen chloride. Especially preferred manufacturing operations to which the process of the invention are applicable are in the production of diphenylmethane diisocyanates (MDI), polyphenylene polymethylene polyisocyanates (polymeric-MDI), and toluene diisocyanates (TDI) due to the large amounts of these isocyanates produced worldwide.

To illustrate one example of the process of the invention on a plant scale production, a process is described herein whereby reagent grade hydrochloric acid is manufactured as a byproduct from the manufacture of TDI. Molten toluenediamine 2,4- and 2,6- isomers, optionally dissolved in a solvent such as o-dichlorobenzene or any other suitable solvent, is charged to a reaction chamber while a stoichiometric excess of phosgene, also optionally dissolved in a solvent such as o-dichlorobenzene, is charged to the reaction chamber and reacted with the toluenediamine. The reaction may take place under superatmospheric pressures and at temperatures ranging from 0° C. to 200° C. in one or more stages, typically in a multi-stage reactor. A hydrogen chloride gas stream containing other gaseous impurities such as phosgene may be drawn from the overhead of a non-pressurized reactor, condensed as a liquid stream, and then distilled to receive hydrogen chloride and separate the phosgene for recycling back to the reaction chamber. The hydrogen chloride gas stream may then flow to one or more adiabatic absorption towers. The hydrogen chloride gas may also come from the vaporization of liquid HCl removed from a pressurized reactor.

Vent streams containing phosgene and hydrogen chloride may be drawn from other sources such as a reactor for the manufacture of phosgene by the catalytic exothermic reaction between carbon monoxide and chlorine, or from the bottoms of the TDI reactor which may contain minor amounts of hydrogen chloride removable by distillation further downstream. These vent gas streams containing hydrogen chloride, TDI, and phosgene may be charged to a countercurrent absorption wash tower at about 0° C. in which phosgene is absorbed in a liquid having a high affinity for phosgene. The liquid wash may be charged to the top of the tower and withdrawn as a phosgene containing liquid from the bottom of the tower, while the separated hydrogen gas is drawn from the overhead. If any traces of phosgene and/or absorbing wash vapor remain in the hydrogen chloride gas stream drawn from the overhead of the tower, the hydrogen chloride gas stream may be washed a second time in a second absorbing wash tower at −60° F. and withdrawn from the overhead of the second tower.

The hydrogen chloride gas streams, which may contain inert gases, collected from some or all sources as desired, including from the phosgenation reactor and downstream vents, may be charged into adiabatic packed absorbers for conversion to hydrochloric acid in which a countercurrent of demineralized water flows from the top of the tower and absorbs the hydrogen chloride. Vent gases from the adiabatic towers may be run through condensers, washed with caustic soda, and destructed. The bottoms from the adiabatic towers are typically composed of 24 to 32 weight percent hydrochloric acid stream at about the boiling point of water. The hydrochloric acid is cooled in condensers to 35° C. to 70° C. and charged to an isothermic falling film absorber to increase the concentration of hydrogen chloride. A hydrogen chloride gas source, such as that coming from the TDI manufacture stage, may be charged towards the top of the falling film absorber. As the hydrogen chloride gas and hydrochloric acid flow over the water-cooled horizontal pipes in the falling film absorber, the hydrogen chloride gas is absorbed into the hydrochloric acid stream to increase the concentration of the hydrochloric acid to the desired level, preferably 36 to 38 weight percent.

The concentrated hydrochloric acid withdrawn from the bottoms may then be charged to the bottom of a 50-gallon bed of, for example, Amberlite® IRA-400, a gelular strong basic anionic exchange resin having as the active sites Type I quaternary ammonium groups and as the anion, chloride. The flow rate into the resin bed controls the desired residence time and may be adjusted to about 10 gpm if a five-minute residence time is desired. Purified reagent grade hydrochloric acid having less than 200 ppb may be withdrawn from the top of the exchange resin bed and sent to storage tanks.

The following experiment is meant to illustrate the nature of the invention and is not intended to limit the scope of the invention.

EXAMPLE

The exchange bed was made by filling ten (10) grams of a strongly basic anion exchange resin Amberlite® IRA-400, a trademark of Rohm & Haas Company and commercially available from Rohm & Hass Company, in a 10 mm diameter silicon hose. The resin was supported in the hose by glass wool.

A ten-liter polypropylene tank padded with nitrogen gas was filled with eight (8) liters of an aqueous hydrochloric acid solution having an HCl concentration of 36 weight percent. The polypropylene tank was connected to the inlet of the resin-filled exchanger hose through a silicon hose. A silicon hose connected the outlet of the exchanger to polypropylene sample flasks through a manually controlled teflon valve to control the flow rate of the acid and thereby control the residence time of the acid over the exchange resin beds. For a residence time of five minutes, the flow rate of the acid was set to 2.5 ml/min as the density of the exchange resin was about 700 g/l. For residence times of one minute, the same flow rate was used except that a different exchanger containing only two grams of exchange resin was used instead of the ten-gram exchanger.

Before each experiment, acid was permitted to flow through the exchanger overnight to stabilize operating conditions. The next morning, an untreated sample of acid run through the exchanger was taken for one hour or until the polypropylene flask was filled with 150 ml of treated acid. The untreated acid samples were taken from various production scale tanks used to store hydrochloric acid obtained from a falling film absorber currently operating in a toluene diisocyanate production plant. Each of the treated acid flasks were tested for iron levels using an ICP instrument (inductively couped plasma) with an AES (Atomic Emission Spectrometer) detector having a detection limit of 80 p.p.b., a second more sensitive ICP/AES* instrument having a detection limit of 40 p.p.b., and by an ICP with an MS (Mass Spectrometer) detector (ICP/MS) having a detection limit of 3 p.p.b. The results are reported below in Table 1. The acid of Samples 1 and 11 were taken from storage tanks containing hydrochloric acid run through an absorption tower currently employed in a TDI production plant.

TABLE 1

| NO. | SAMPLE | RESIDENCE TIME (min) OVER IRA-400 EXCHANGE RESIN | ICP/AES p.p.b. | ICP/AES* p.p.b. | ICP/MS p.p.b. |
|---|---|---|---|---|---|
| 1 | UNTREATED ACID | 0 | 210 | <40 | 87 |
| 2 | NO. 1 TREATED | 5 | <80 | <40 | — |
| 3 | NO. 1 SPIKED W/ 0.3 ppm Fe III | — | 780 | 330 | 490 |
| 4 | NO. 3 TREATED | 5 | 100 | <40 | 3 |
| 5 | NO. 1 SPIKED W/ 1.0 ppm Fe III | — | 1900 | 1250 | 1680 |
| 6 | NO. 5 TREATED | 1 | 230 | <40 | 28 |
| 7 | NO. 1 SPIKED W/ 1.0 ppm Fe II | — | 1220 | 487 | — |
| 8 | NO. 7 TREATED | 5 | 100 | <40 | — |
| 9 | NO. 1 SPIKE W/0.5 ppm Fe II, 0.5 ppm Fe III | — | — | 996 | — |
| 10 | NO. 9 TREATED | 1 | — | <40 | — |
| 11 | UNTREATED ACID | — | 260 | 108 | — |
| 12 | NO. 11 TREATED | 5 | <80 | <40 | — |

The results indicated that at residence times of one minute and five minutes, the anionic exchange resin effectively removed iron from untreated and spiked hydrochloric acid well below the 200 p.p.b. threshold. The anionic exchange resin was also effective in removing ferric $Fe^{+2}$ iron from the acid without first applying any oxidation treatment to the iron.

In other experiment, hydrochloric acid run over an industrial size bed of Amberlite® IRA-400 strongly basic anion exchange resin in gel form at a residence time of about 2.5 minutes was tested for iron impurities using the ICP/AES* instrument attached to an ultrasonic nebulizer to enhance the detection limit down to about 5 p.p.b. Prior to entry in the resin bed, the hydrochloric acid stream contained 240 p.p.b. iron, and after treatment for 2.5 minutes over the resin bed, contained only 9 p.p.b. iron, indicating that the resin successfully removed iron impurities.

What we claim is:

1. A method of producing reagent grade hydrochloric acid from the production of organic isocyanates comprising the steps of:
   a) reacting an organic amine with phosgene in a chamber to form an organic isocyanate and hydrogen chloride,
   b) removing said hydrogen chloride from said chamber,
   c) converting the removed hydrogen chloride to a hydrochloric acid steam having a hydrochloric acid concentration of between 25 weight percent to 42 weight percent at one atmosphere pressure and 25° C. and including both $Fe^{+2}$ and $Fe^{+3}$ iron impurities, and
   d) contacting the hydrochloric acid stream with a strong basic anion exchange resin for a residence time ranging from 30 seconds to one hour to remove said iron impurities without oxidizing $Fe^{+2}$ prior to removal to $Fe^{+3}$ to thereby obtain hydrochloric acid having an iron content of no more than 200 p.p.b.

2. The method of claim 1, wherein the concentration of hydrochloric acid in the hydrochloric acid stream is from 36 weight percent to 38 weight percent based on the total weight of all ingredients in the hydrochloric acid stream.

3. The method of claim 1, wherein the hydrogen chloride is removed from the reaction of said organic amine with phosgene in step a) and is converted to an aqueous hydrochloric acid stream by contacting with water, said aqueous hydrochloric acid stream thereafter contacting said strong basic anionic exchange resin to reduce iron impurities contained in the aqueous stream to a level wherein the resulting hydrochloric acid is reagent grade.

4. The method of claim 1, wherein the exchange resin is a gel having quaternary ammonium groups as active sites.

5. The method of claim 4, wherein the quaternary ammonium groups are $-N(CH_3)_3^+$.

6. The method of claim 1 wherein the hydrogen chloride removed from the organic isocyanate in step b) comprises liquid hydrogen chloride and the liquid hydrogen is converted to aqueous hydrochloric acid in step c).

7. A method of producing reagent grade hydrochloric acid from the production of organic isocyanates comprising the steps of:
   a) reacting an organic amine with phosgene to form an organic isocyanate and hydrogen chloride,
   b) removing said hydrogen chloride from said organic isocyanate,
   c) converting the removed hydrogen chloride to a hydrochloric acid stream which includes iron impurities occurring in both $Fe^{+2}$ and $Fe^{+3}$ oxidation states and whose concentration of hydrochloric acid is between 22.4 Bé to 23.8 Bé, and
   d) contacting the hydrochloric acid stream with a strong basic anion exchange resin to thereby remove said iron impurities without converting $Fe^{+2}$ to $Fe^{+3}$ prior to removal to obtain hydrochloric acid having an iron content of no more than 200 p.p.b.

8. The method of claim 7, wherein the hydrochloric acid stream comprises an aqueous hydrochloric acid stream.

9. The method of claim 8, wherein the exchange resin comprises a gel having quaternary ammonium groups comprising $-N(CH_3)_3^+$.

10. The method of claim 8, wherein the aqueous hydrochloric acid stream comprises iron impurities in an $Fe^{+2}$ oxidation state which contact the exchange resin.

11. The method of claim 8, wherein the aqueous hydrochloric acid contacts the exchange resin for a residence time ranging from 30 seconds to six minutes.

12. A method of removing iron impurities from a hydrochloric acid stream comprising the steps of:
   a) providing a hydrochloric acid stream having a hydrochloric acid concentration of between 25 weight percent to 42 weight percent at one atmosphere and 25° C., said stream including both $Fe^{+2}$ and $Fe^{+3}$ iron impurities wherein the total amount of iron impurities is above 200 p.p.b.; and
   b) contacting the hydrochloric acid stream with a strong basic anion exchange resin for a residence time of from 30 seconds to one hour to remove said iron impurities without oxidizing $Fe^{+2}$ to $Fe^{+3}$ prior to removal to thereby obtain hydrochloric acid having an iron content of no more than 200 p.p.b.

13. The method of claim 12, wherein the concentration of hydrochloric acid in the hydrochloric acid stream is from 36 weight percent to 38 weight percent based on the total weight of all ingredients in the hydrochloric acid stream.

14. The method of claim 12, wherein said hydrochloric acid stream is obtained by reacting an organic amine with phosgene to form an organic isocyanate and hydrogen chloride, separating the hydrogen chloride from the reaction of said organic amine with phosgene and thereafter converting said hydrogen chloride to an aqueous hydrochloric acid stream.

15. The method of claim 14 wherein said hydrogen chloride is reacted with water to obtain said hydrochlorine acid stream.

16. The method of claim 12, wherein the exchange resin is a gel having quaternary ammonium groups as active sites.

17. The method of claim 16, wherein the quaternary ammonium groups are —$N(CH_3)_3+$.

18. The method of claim 15 wherein the hydrogen chloride removed from the organic isocyanate comprises liquid hydrogen chloride.

* * * * *